United States Patent [19]

Demler, Sr.

[11] 3,743,245
[45] July 3, 1973

[54] ROTARY CAM AXIALLY ACTUATED DIAPHRAGM VALVE

[75] Inventor: Henry William Demler, Sr., Lebanon, Pa.

[73] Assignee: AMP Incorporated, Harrisburg, Pa.

[22] Filed: Dec. 10, 1971

[21] Appl. No.: 206,702

[52] U.S. Cl................. 251/257, 251/251, 251/331
[51] Int. Cl............................................ F16k 31/52
[58] Field of Search.................. 251/331, 257, 252, 251/256, 251

[56] References Cited
UNITED STATES PATENTS

| | | | |
|---|---|---|---|
| 3,395,888 | 8/1968 | Neto | 251/256 |
| 3,053,499 | 9/1962 | Jones | 251/331 X |
| 2,074,240 | 3/1937 | Sanders | 251/331 X |

Primary Examiner—Arnold Rosenthal
Attorney—William J. Keating et al.

[57] ABSTRACT

A rotary cam axially actuated diaphragm valve having a rotating valve stem adapter and a valve stem splined thereto. The valve stem is in abutting relationship with a cam on its upper surfaces, and in abutting relationship with a pressure pad on its lower surface. Similarily, the pressure pad is in abutting relationship with a diaphragm on its lower surface, the diaphragm controlling the flow of fluid through the valve; a brass spacer separates the valve stem from the diaphragm. Upon rotation of the valve stem adapter and its splined valve stem, the valve stem contacts the cam which forces the valve stem in an axially downward direction, the axial movement of the stem forcing the non-rotating pressure pad to also move in an axial downward direction, such axial movement of the pad sequentially moving the non-rotating diaphragm in an axial downward direction until closure of the valve is attained. Further rotation of the valve stem adapter and valve stem permits recession of the camming force with a consequent movement of the various components in an axially upward direction and the ultimate opening of the valve to its original fully open position.

1 Claim, 4 Drawing Figures

ROTARY CAM AXIALLY ACTUATED DIAPHRAGM VALVE

BACKGROUND OF THE INVENTION

The present invention relates generally to valves and more particularly to an improved cam-operated diaphragm valve.

Cam-operated diaphragm valves of the character described above are widely employed in gas or liquid flow-lines so as to regulate the flow thereof under normal operating conditions or in instances in which maintenance or repair in the flow system is necessitated. One of the problems encountered in the operation of present cam-operated diaphragm valves is the rapid deterioration of the diaphragm. This is due to the fact that in such conventional valves, the cam or other parts, moving under pressure, come into contact with the diaphragm, the rotational movement of the cam acting against the non-rotating diaphragm creating friction and the consequent wear of the diaphragm. As a result of such wear, frequent replacement of the diaphragm or entire valve assemblies are generally necessitated.

SUMMARY OF THE INVENTION

Accordingly, it is an object of the present invention to provide an improved cam-operated diaphragm valve.

Another object of the present invention is to provide an improved cam-operated diaphragm valve which is easy to operate, and easy to assemble and disassemble.

Still another object of the present invention is to provide an improved cam-operated diaphragm valve which prevents leakage.

Yet another object of the present invention is to provide an improved cam-operated diaphragm valve which resists corrosion.

It is a further object of the present invention to provide an improved cam-operated diaphragm valve in which a low pressure drop is attained between the valve's inner tubular passageway, or inlet, and the valve's outer tubular passageway, or outlet.

A still further object of this invention is the provision of an improved cam-operated diaphragm valve which may be used with plastic tubing.

A yet further object of this invention is the provision of an improved cam-operated diaphragm valve which reduces friction and wear, and thereby extends the life of the valve, thus obviating frequent repair or replacement.

The foregoing objectives are achieved by the invention through a valve assembly having a valve stem adapter and a valve stem mating therewith and operated thereby. The valve stem has several surfaces which are operatively biased by corresponding cam surfaces of a cylindrical cam as the valve stem adapter or valve stem are rotated. Upon rotation, the valve stem also moves in an axial direction due to the camming action of the cylindrical cam and acts upon a non-rotating, but axially movable pressure pad which in turn acts upon a non-rotating axially flexible diaphragm, the diaphragm being seated upon an interior seat of a valve body sub-assembly directly above an inner tubular passageway which connects to an inlet passageway on the one side and an outlet passageway on the other side, and thus being able to control the flow of fluid through the valve assembly. Hence, the rotating valve stem does not contact the non-rotating diaphragm; to additionally prevent contact between the rotating valve stem and the non-rotating diaphragm, a brass spacer is located therebetween.

BRIEF DESCRIPTION OF THE DRAWINGS

Various other objects, features and attendant advantages of the present invention will be more fully appreciated as the same becomes better understood from the following detailed description when considered in connection with the accompanying drawings, in which like reference characters designate like or corresponding parts throughout the several views, and wherein.

DETAILED DESCRIPTION OF A PREFERRED EMBODIMENT

Figure 1:
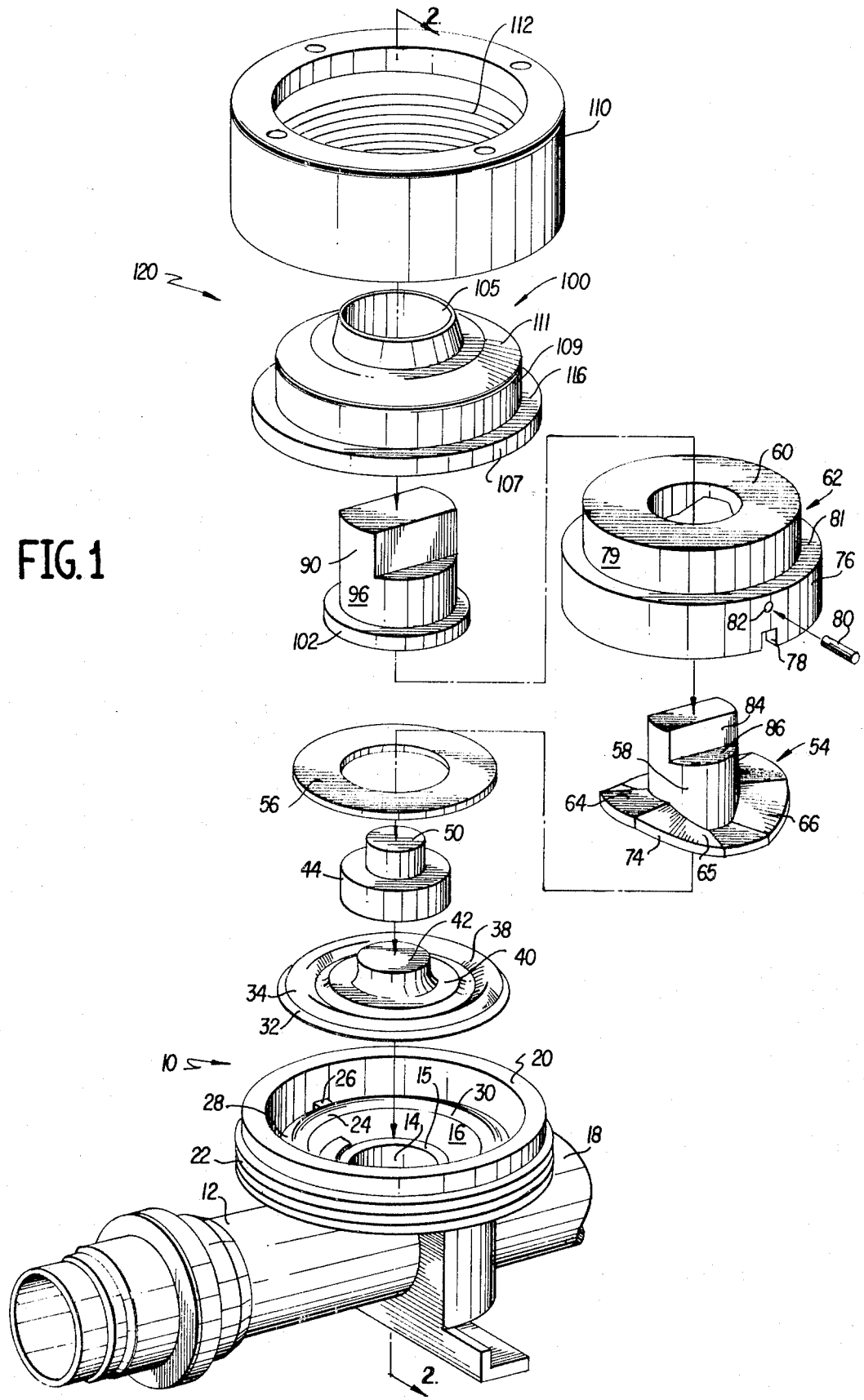
FIG. 1 is an exploded perspective view of the valve assembly constructed according to this invention and showing its cooperative parts.
Figure 2:
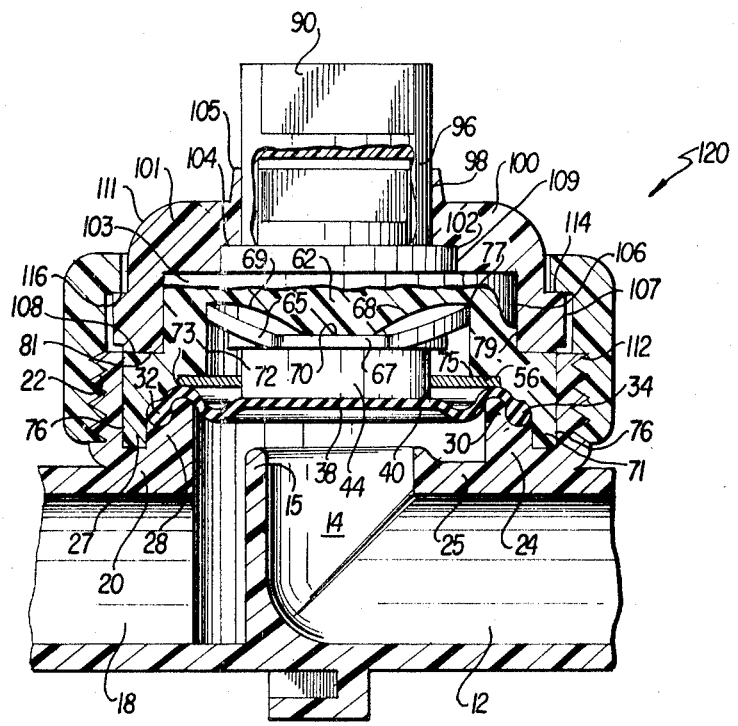
FIG. 2 is a partial cross-section view of an assembled valve assembly as illustrated in FIG. 1, taken along line 2—2 of FIG. 1, selected parts of which are cut away for a clearer view of the valve assembly in its normal operating or open position.
Figure 4:
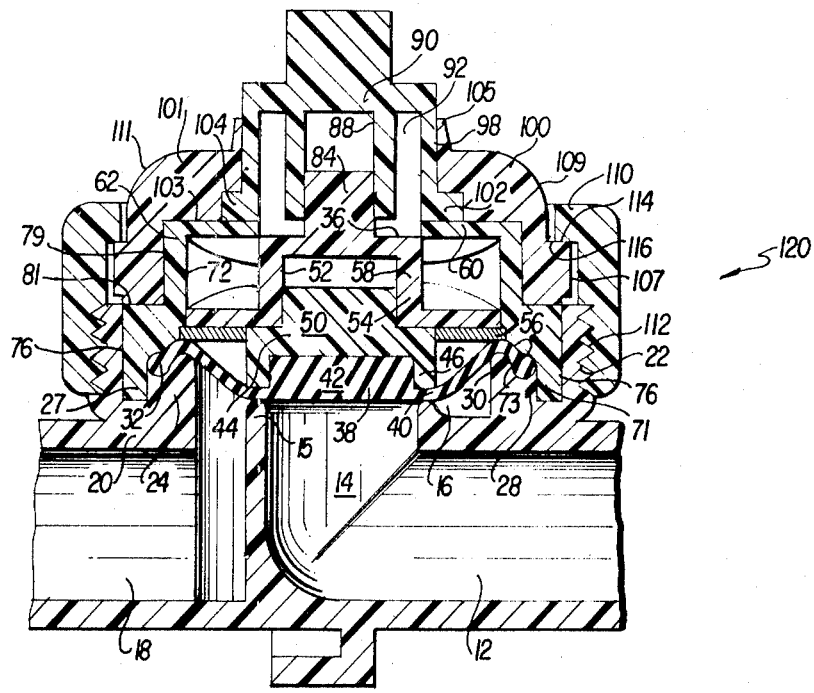
FIG. 4 is still another partial cross-section view of an assembled valve assembly as illustrated in FIG. 1, taken along line 2—2 of FIG. 1, wherein selected parts different from those of FIG. 2 and FIG. 3 are cut away for an additional view of the valve assembly in its closed position.

Referring now to the drawings wherein like reference characters designate same or similar parts throughout the several views, and more particularly to FIGS. 1, 2 and 4 thereof, there is shown a valve body sub-assembly generally indicated by the reference character 10 comprising a fluid inlet passageway 12 leading into a perpendicularly oriented inner tubular passageway 14, which in turn leads into an outer arcuate passageway 16 and a fluid outlet passageway 18. The upper peripheral edge 15 of the inner tubular passageway 14 forms a closure seal with a diaphragm of the valve in question, as will be more fully disclosed hereinafter. Integral with the above-referenced portions of the sub-assembly 10 is a cylindrical casing or housing means 20 upon which there are located exterior threads 22. Located interiorly of housing means or casing 20 and integral therewith, is a ring 24 having upon its upper peripheral edge a circumferential groove 28 for receiving, in seating relationship, a peripheral bead 32 of a diaphragm member 38. Concentric with groove 28 and interiorly thereof, is an upstanding annular bead 30 for seating engagement with a corresponding annular groove 34 in the face of diaphragm 38. A base portion 25 (see FIGS. 2 and 4) integrally connecting housing means 20 with inner ring 24, defines a groove 27. In addition, a pair of diametrically opposed radial ribs 26 are disposed in groove 27, thus additionally interconnecting ring member 24 and housing means 20. Base portion 25 also integrally connects ring member 24 with inner tubular passageway 14, but only on the inlet half of valve sub-assembly 10, thereby defining arcuate passageway 16 on the outlet half of subassembly 10, whereby fluid, flowing through inner tubular passageway 14 from inlet passageway 12 is prevented from returning to inlet passageway 12 and must flow toward outlet passageway 18 via arcuate passageway 16.

Diaphragm 38, which may be formed of a thin, resilient, flexible material such as, for example rubber, further includes a shoulder portion or flange 40 and an upstanding neck portion or stem 42. A pressure pad 44 has an annular base 46 which is centrally recessed as at 48, the base 46 resting upon the diaphragm shoulder or flange 40, with the pad recess 48 receiving the diaphragm neck or stem 42. Similarly, pressure pad 44 includes an upstanding neck portion or stem 50 which is received within a recess portion 52 of a valve stem 54 (see FIG. 4). Located between diaphragm 38 and valve stem 54 is an annular brass spacer 56, which rests upon the upper surface 57, of diaphragm 38, upper surface 57 corresponding to groove 34, while at the same time surrounding the base 46 of pressure pad 44, thus preventing any direct contact between the valve stem and the diaphragm, as will be more apparent hereinafter.

Valve stem 54 further includes an upstanding neck portion or stem 58, and a substantially radially extending skirt portion 63 (see FIG. 1). The upper surface of skirt portion 63 provides camming surfaces composed of raised, diametrically opposed, portions 64, lower, diametrically opposed, portions 67 perpendicularly oriented with respect to portions 64, and interconnecting inclined portions 65 and 66.

Cylindrical cam 62 has an annular base portion 71, the interior surface of which leads to an upwardly and inwardly inclined scalloped surface 73, which terminates at an annular surface 75, and a pair of diametrically opposed slots 78. Thus, when cylindrical cam 62 is inserted interiorly of casing or housing means 20, annular surface 75 and inclined surface 73 will be seated over brass spacer 56, and the groove and bead portions of diaphragm 38, respectively; similarly, annular base 71 will be positioned within groove 27, while slots 78 will be fittingly engaged with ribs 26, thereby preventing rotation of cam 62 relative to valve sub-assembly 10. Cylindrical cam 62 further includes an upstanding inner cylindrical surface 72 and an integrally connected annular cap portion 60. Cylindrical surface 72, which guides and confines the travel of outer edge 74 of the valve stem 54 in both its rotative and axial movements, as will be more fully apparent hereinafter, contains a pin 80, inserted in a recess 82, extending interiorly of surface 72 at a position below the level corresponding to the lowest axial movement of valve stem 54, so as not to interfere with such axial movement of valve stem 54 and yet prevent the axial removal of valve stem 54 from cam 62. Annular cap 60, which surrounds neck portion 58 of valve stem 54, has a lower interior surface which includes camming surfaces composed of raised, diametrically opposed portions 77, lower, diametrically opposed portions 70, perpendicularly oriented with respect to portions 77, and interconnecting inclined portions 68 and 69, all of which cooperatively mate with portions 64, 67, 65 and 66, respectively, of valve stem 54. An exterior cylindrical surface 76, extending upwardly from base 71, and an exterior cylindrical surface 79, extending downwardly from cap 60, define therebetween a lateral flange portion 81.

Valve stem 54 additionally includes an upstanding tongue and laterally extending flange portion, 84 and 86 respectively, flange 86 being formed by the lateral extension, of the upper surface of neck portion or stem 58, from the base of tongue 84. Tongue 84 is received within a groove or recess 88 of valve stem adapter 90, the recess 88 being formed by two vertical members or strips 92, 94, (see FIG. 4) the bottoms of which rest upon valve stem flange portions 86 when the valve is in its open position. Valve stem adapter 90 further includes an upstanding neck or stem 96 and a laterally extending flange portion 102.

A valve cover 100 has an annular base 108, which rests upon flange surface 81 of cylindrical cam 62, and an upstanding interior cylindrical surface 106 which surroundingly engages exterior surface 79 of cylindrical cam 60. Cover 100 further includes an integral cap portion 101, the lower interior surface of which 103, is annular, and a centrally located upstanding cylindrical surface 105, which defines a recess 98, and of which such cylindrical surface 105, together with annular surface 103, define therebetween a countersunk recess portion 104. It is thus apparent, that as valve cover 100 is placed upon cylindrical cam 62, lower annular surface 103 of cover 100 will rest upon cap portion 60 of cylindrical cam 62 while neck portion 96 of valve stem adapter 90 is received within recess 98 of valve cover 100 and valve stem adapter flange 102 will be received within countersunk portion 104 of valve cover 100. Valve cover 100 lastly includes an exterior cylindrical surface 107 extending upwardly from base 108, and an exterior cylindrical surface 109 extending downwardly from the upper surface 111 of cap portion 101, thereby defining therebetween a flange portion 116.

Finally, cylindrical jam nut 110, with internal threads 112, is threadingly engaged upon cylindrical housing means or casing 20, with its external threads 22. Jam nut 110 further includes a flange member 114 which engages flange portion 116 of valve cover 100. Hence, when the jam nut 110 is threaded onto the housing means or casing 20, the entire valve assembly, generally indicated by the reference character 120, is locked together.

Referring now to FIG. 2, it will be seen that in the normal open operating position, fluid enters inlet passageway 12 and proceeds to inner tubular passageway 14. As valve stem adapter 90, and valve stem 54, which is splined to valve stem adapter 90, are in such position that camming surface 66 of valve stem 54 is not yet in contact with camming surface 68 of cylindrical cam 62, valve stem 54 is in its normal raised position. Consequently, pressure pad 44 is in its normal raised position, and diaphragm 38 is similarly located. Hence, as diaphragm 38 is not contiguous with closure seal 15, fluid entering inner tubular passageway 14 is permitted to enter outer arcuate passageway 16 and continue on into inlet passageway 18. It will be noted that under such flow conditions, the bead and groove 32 and 34, respectively, of diaphragm 38, together with corresponding portions 28 and 30 of ring 24, provide a static seal, thus confining all fluid flow solely to the areas of the respective passageways 14, 16 and 18, all of which lie below diaphragm 38.

Figure 3:
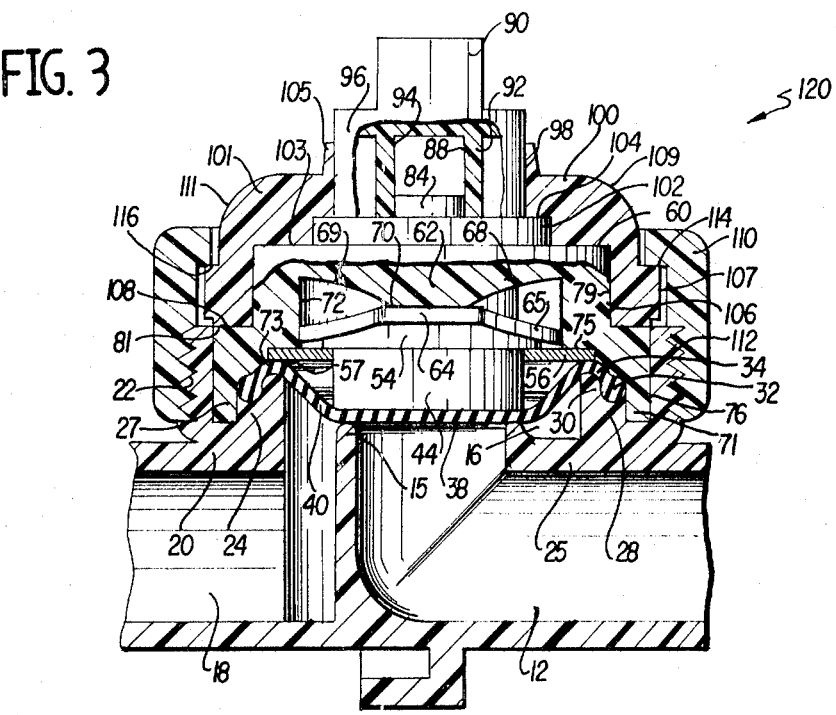
FIG. 3 is another partial cross-section view of an assembled valve assembly as illustrated in FIG. 1, taken along line 2—2 of FIG. 1, selected parts of which are cut away for a clearer view of the valve assembly in its closed position.

Referring now to FIG. 3, it will be seen that in the closed position, contrary to that described above with reference to the normal open operating position, valve stem adapter 90 and its associated splined valve stem 54 have been rotated 90°. As the adapter 90 and stem 54 are rotated, camming surface 66 of valve stem 54 comes into contact with camming surface 68 of cylindrical cam 62, the camming action of which begins to force valve stem 54 axially downward, tongue 84 of valve stem 54 axially sliding downward within recess 88 of valve stem adapter 90, guided in such movement by vertical members 92, 94. Valve stem 54 attains its nadir when it has been rotated 90° from the valve's full open position, and hence, open and closed positions of the subject valve are separated by 90° of rotation. At the fully closed position, camming surface 64, of valve stem 54, and camming surface 70, of cylindrical cam 62, are completely contiguous throughout their respective lengths.

As valve stem 54 is both rotating and linearly moving axially downward, it in turn axially acts upon non-rotating pressure pad 44, causing it to similarly move axially downward. The axial movement of pressure pad 44, which is constantly in an abutting position with diaphragm 38, causes the axially downward flexing movement of non-rotating diaphragm, which, upon reaching its nadir, abuts the upper peripheral surface 15 of inner tubular passageway 14, thus effecting a closure seal and consequent termination of fluid flow.

Still referring to FIG. 3, it will be apparent that as the valve stem adapter 90 and valve stem 54 are rotated further, i.e., past the fully closed position, camming surface 64 will slip out of contact with camming surface 70, thus permitting camming surface 65 to commence an arcuate movement along camming surface 69. As such movement progresses, valve stem 54 will rise or move in an axially upward direction. Such movement of stem 54 permits pressure pad 44 to likewise move in an axially upward direction and similarly for diaphragm 38. Such upward movement will continue until the valve stem 54 has rotated 90° from the valve's fully closed position of FIG. 3, at which time the valve will again be in its fully open position as in FIG. 2.

It will additionally be noted from an inspection of FIGS. 2 and 3 that rotating valve stem 54 makes no contact whatever with non-rotating diaphragm 38 due to the presence of brass spacer 56, which is situated therebetween. Hence, as diaphragm 38 is prevented from coming into frictional contact with any moving parts, excessive wear is eliminated and its service life consequently prolonged.

It should be noted further, that all parts that rotate or come in contact with other parts are made of dissimilar materials to again reduce dynamic friction and prevent excessive wear. For example, the pressure pad 44 may be formed of a plastic material, whereas diaphragm 38 may be formed of rubber and the valve stem 54 may be formed of a synthetic material; such dissimilarity in material, in this particular instance, allows the valve stem to rotate relative to the pressure pad but causes the pressure pad to remain stationary relative to the diaphragm.

Thus, it may be seen that the cam-operated diaphragm valve of the present invention has important advantages over the known prior art structures in that a rotary cammed valve stem axially actuates a non-rotary axially movable pressure pad which in turn axially actuates the valve's non-rotating diaphragm, thereby regulating the fluid flow. As such, and in combination with a brass spacer located between the rotary valve stem and stationary diaphragm, excessive wear of the latter is prevented, and frequent repair or replacement of which is obviated.

Obviously, many modifications and variations of the present invention are possible in light of the above teachings. It is to be understood, therefore, that within the scope of the appended claims the present invention may be practiced otherwise than as specifically described herein. Accordingly,

What is claimed as new and desired to be secured by Letters Patent of the United States is:

1. A cam-operated diaphragm valve assembly comprising:
   a. a valve body having inlet and outlet passageways interconnected by a perpendicularly oriented tubular passageway, said tubular passageway having an edge portion thereon,
   b. a non-rotating, flexible diaphragm having an upstanding stem portion and a radial flange positioned adjacent said edge portion;
   c. a non-rotating, axially movable pressure pad positioned on top of said diaphragm, said pad having an upstanding stem, a downwardly opening recess for receiving said stem portion of said diaphragm and a radial flange for abutting said flange on said diaphragm;
   d. a rotatable and axially movable valve stem positioned on top of said pressure pad and having an upstanding stem, downwardly opening recess for receiving said stem on said pressure pad, and further having a radially extending camming surfaces consisting of diametrically opposed raised portions, diametrically opposed lower portions and inclined portions connecting said raised portions to said lower portions;
   e. spacer means positioned between said diaphragm and said valve stem for preventing direct contact thereinbetween;
   f. a cylindrical cam positioned in said tubular passageway in overlying relation to said diaphragm, pressure pad and valve stem, said cam having an opening to admit said stem on said valve stem therethrough and further having, internally thereof and in registration with said camming surfaces on said valve stem camming surfaces consisting of diametrically opposed raised portions, diametrically opposed lower portions and inclined portions connecting said raised portions to said lower portions;
   g. rotating means positioned on said stem on said valve stem for rotating said valve stem so that said camming surfaces on said valve stem and on said cylindrical cam cooperate to move said valve stem axially against said pressure pad which then pushes said radial flange on said diaphragm into sealing engagement with said edge portion in said tubular passageway or away from said pressure pad which permits communication between said inlet and said outlet passageway.

* * * * *